United States Patent [19]

Ito et al.

[11] Patent Number: 4,716,761
[45] Date of Patent: Jan. 5, 1988

[54] METHOD AND JIG FOR DYNAMICALLY BALANCING AN ASSEMBLY OF THE JIG AND ROTOR

[75] Inventors: Shigenori Ito, Kasugai; Minoru Machida, Nagoya, both of Japan

[73] Assignee: NGK Insulators, Ltd., Japan

[21] Appl. No.: 781,727

[22] Filed: Sep. 30, 1985

[30] Foreign Application Priority Data

Oct. 3, 1984 [JP] Japan ................................. 59-207731

[51] Int. Cl.$^4$ ..................... G01M 1/36; G01M 13/00; F01D 5/10; F16F 15/32
[52] U.S. Cl. .................................... 73/118.1; 73/455; 73/469; 74/573 R; 416/145
[58] Field of Search ................. 73/460, 468, 469, 487, 73/455, 456, 118.1; 74/573 R; 416/144, 145, 241 B, 244 A, 500

[56] References Cited

U.S. PATENT DOCUMENTS 3,151,488 10/1964 Tracy et al. ........................... 74/573
4,123,199 10/1978 Shimizu et al. .................. 416/241 B

FOREIGN PATENT DOCUMENTS 621061 5/1961 Canada ................................. 74/573

Primary Examiner—John Chapman
Attorney, Agent, or Firm—Parkhurst & Oliff

[57] ABSTRACT

A method of dynamically balancing an assembly of a metal jig and a ceramic rotor attached thereto, the ceramic rotor having a shaft portion, and the metal jig having at its one axial end a fixing hole, comprising the steps of: inserting the shaft portion of the ceramic rotor into the fixing hole of the metal jig, and thereby fixing the ceramic rotor to the metal jig to provide the assembly; and dynamically balancing the assembly by fixing at least one balancing piece in at least one of a plurality of balancing holes which are formed in the metal jig, the balancing holes being open in an outer surface of the metal jig. Also disclosed is a metal jig of a generally cylindrical shape for rotating a ceramic rotor in a dynamically balanced condition, having a fixing hole in its one axial end portion, in which a shaft portion of the ceramic rotor is inserted and fixed. The jig further has balancing portions defining a plurality of balancing holes which are formed in the one axial end portion and the other axial end portion. The balancing holes are open in an outer surface of the jig, and are adapted to retain therein a balancing piece.

11 Claims, 6 Drawing Figures

U.S. Patent   Jan. 5, 1988   4,716,761
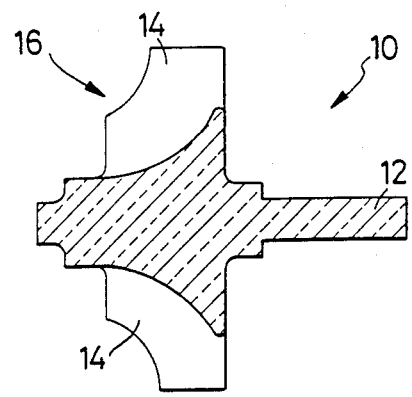
FIG. 1
FIG. 2
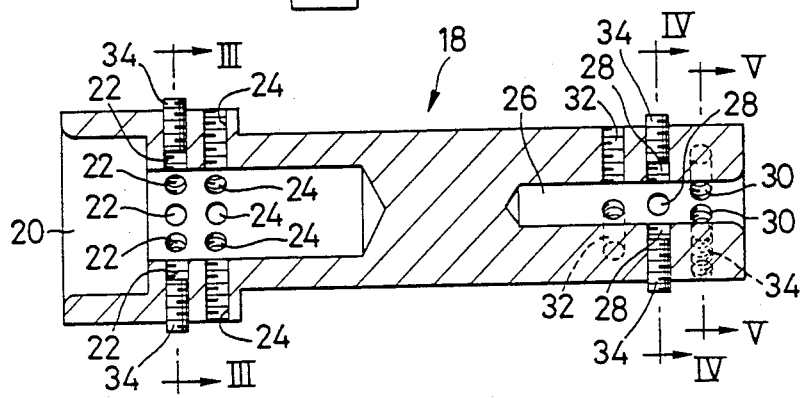
FIG. 3   FIG. 4   FIG. 5
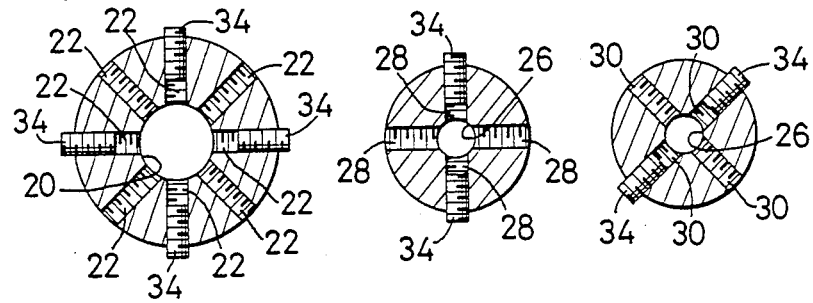
FIG. 6
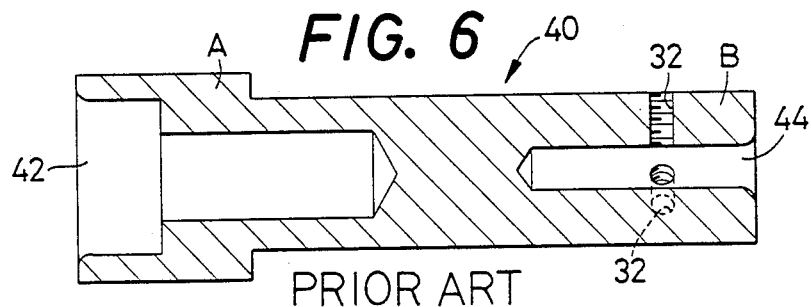
PRIOR ART

METHOD AND JIG FOR DYNAMICALLY BALANCING AN ASSEMBLY OF THE JIG AND ROTOR

BACKGROUND OF THE INVENTION

1. Field of the Invention

The present invention relates to a jig for a spinning test of a ceramic rotor, capable of dynamically balancing an assembly of the jig and the ceramic rotor mounted in the jig, and further relates to a method of dynamically balancing the jig-rotor assembly.

2. Related Art Statement

Various rotors for turbochargers and axial-flow turbines, and for other applications are known. In recent years, there is an increasing tendency that such rotors are formed of ceramic materials which are excellent in heat resistance and are lightweight. Commonly, these ceramic rotors are produced by adding an organic binder to a selected ceramic material, injection-molding the ceramic-binder mixture to a desired configuration, removing the binder from the molded piece, and finally firing the molded piece. For assuring high quality and reliability of the ceramic rotors, all of these products are subjected to non-destructive and spinning tests.

In a spinning test of a ceramic rotor, the rotor is spun or rotated at a high speed to check if the rotor meets prescribed standards of performance. Generally, the ceramic rotor to be tested is mounted in a suitable metal jig of a generally cylindrical shape having a fixing hole, such that the rotor is fixed in the fixing hole by means of a shrink fit or a press fit. The jig is attached to a driving shaft of a spinning tester. To avoid vibrations of an assembly of the ceramic rotor and the jig at a high testing speed, the assembly must be dynamically balanced prior to the spinning test. To dynamically balance the jig-rotor assembly, a method is known, wherein the jig with the ceramic rotor fixed thereto is mounted on a dynamic balancing machine to find a dynamic unbalance. The jig-rotor assembly is dynamically balanced by cutting off necessary amounts of material from appropriate portions of the metal jig.

3. Problems Solved by the Invention

However, such a known conventional balancing method wherein the jig-rotor assembly is dynamically balanced by removing material from a metal jig, is time-consuming and cumbersome, and requires a high level of craftsmanship. Furthermore, the number of times that a metal jig can be used is limited because of repeated cuts of material from the jig for a plurality of individual rotors. Consequently, the known method is disadvantageous in terms of testing efficiency and economy, particularly where a large number of ceramic rotors must be tested. This is a problem encountered in the prior art, that must be solved.

Another problem associated with the above-indicated known method lies in the requirement that the metal jig in which a ceramic rotor is shrink-fit should be heated again to permit the ceramic rotor to be removed from the jig after a spinning test of the rotor is completed. The procedures for mounting and dismounting the ceramic rotor from the metal jig also require a lot of time. Further, the heating and shrinkage of the metal jig for mounting the ceramic rotor, and the subsequent heating for removing the rotor, will cause the metal jig to be oxidized due to exposure to a high temperature. As a result, the life expectancy of the metal jig is further shortened.

SUMMARY OF THE INVENTION

It is therefore an object of the present invention to provide an improved jig for dynamically balancing an assembly of the jig and a ceramic rotor attached thereto. Another object of the invention is the provision of a method for dynamically balancing the assembly of the jig and the ceramic rotor.

According to the present invention, there is provided a method of dynamically balancing an assembly of a metal jig and a ceramic rotor attached thereto, the ceramic rotor having a shaft portion, and the metal jig having at its one axial end a fixing hole, comprising the steps of: inserting the shaft portion of the ceramic rotor into the fixing hole of the metal jig, and thereby fixing the ceramic rotor to the metal jig to provide the assembly; and dynamically balancing the assembly by fixing at least one balancing piece in at least one of a plurality of balancing holes which are formed in the metal jig, the balancing holes being open in an outer surface of the metal jig.

In the method of the invention as described above, the assembly of the jig and the rotor may be readily dynamically balanced by simply fixing a suitable number of balancing pieces in the appropriate balancing holes, without removing any portions of the jig as practiced in the prior method. Accordingly, the dynamic balancing procedure is completed in a shorter amount of time. Furthermore, the jig may be used repeatedly, since the jig is not subject to cutting or grinding to remove its stock for dynamic balancing purposes.

According to one advantageous embodiment of the invention, the balancing holes are tapped holes for receiving externally threaded screws.

According to another advantageous embodiment of the invention, the balancing holes are formed in the radial direction of the metal jig, and the assembly is dynamically balanced by changing a radial position of at least one balancing piece in a corresponding balancing hole.

Alternatively, the assembly may be dynamically balanced by removing and/or fixing at least one balancing piece from or into the corresponding balancing hole.

In accordance with another embodiment of the invention, the at least one balancing piece comprises pieces of different sizes. Alternatively, the at least one balancing piece comprises pieces of different weights.

The shaft portion of the ceramic rotor may be fixed in the fixing hole with a bonding agent. In this instance, the service life of the jig is prolonged, since the fixation of the rotor to the jig may be achieved at a comparatively low temperature.

According to another aspect of the invention, there is provided a jig of a generally cylindrical shape for rotating a ceramic rotor in a dynamically balanced condition, comprising: one axial end portion having a fixing hole in which a shaft portion of the ceramic rotor is inserted and fixed; and balancing portions defining a plurality of balancing holes which are formed in the one axial end portion and the other axial end portion of the jig, and which are open in an outer surface of the jig. The balancing holes are adapted to retain therein a balancing piece.

The balancing holes are preferably formed in the radial direction of the jig. The balancing holes may consist of a first group of holes and a second group of holes which are formed in the one axial end portion and the other axial end portion, respectively. In this case, the holes of each one of the first and second groups are equally spaced from each other in the circumferential direction of the jig. Further, each of the first and second groups of holes may consist of two sets of holes which are spaced apart from each other in the axial direction of the jig.

According to a preferred embodiment of the jig of the invention, the balancing holes are tapped holes for receiving externally threaded pieces.

BRIEF DESCRIPTION OF THE DRAWINGS

The above and other objects, features and advantages of the present invention will clearly appear from the following detailed description and from the accompanying drawings, in which:

FIG. 1 is a view in cross section of one example of a ceramic rotor;

FIG. 2 is a cross sectional view of one embodiment of a jig of the invention used for testing the ceramic rotor of FIG. 1;

FIGS. 3, 4 and 5 are views in cross section taken along lines III—III, IV—IV and V—V of FIG. 2; and FIG. 6 is a cross sectional view showing a known jig for testing a ceramic rotor.

DETAILED DESCRIPTION OF THE INVENTION

The concept and principle of the present invention will be further clarified by reference to the accompanying drawings.

A ceramic rotor to which the invention is applicable is commonly made, for example, of silicon nitride ($Si_3N_4$), silicon carbide (SiC) or SIALON. However, other suitable ceramic materials such as alumina ($Al_2O_3$) and zirconia ($ZrO_2$) may be used, provided the ceramic materials used result in the ceramic rotor having the requisite mechanical properties. According to one method of manufacture, a suitable binder is mixed with such a ceramic material, and the mixture is injection-molded into a desired shape. After the binder is removed, the molded ceramic piece is fired into the desired ceramic rotor.

While ceramic rotors are used for turbochargers and axial-flow turbines, and in other fields of application, the dynamic balancing method of the invention is applicable to any type of ceramic rotor which has a shaft portion on one axial side thereof. An example of turbocharger ceramic rotors is illustrated in FIG. 1, wherein a ceramic rotor generally indicated at 10 has a shaft portion 12 on one axial side thereof, and a vane portion 16 at one end of the shaft portion 12. The vane portion 16 has a plurality of circumferentially spaced-apart vanes or blades 14.

In conducting a spinning test of the ceramic rotor 10, the shaft portion 12 is fixed to a suitable metal jig of a generally cylindrical shape which is also provided according to the invention. An example of such a jig is shown in FIGS. 2 through 5.

The cylindrical metal jig generally indicated at 18 in FIG. 2, is used to holed the turbocharger ceramic rotor 10 of FIG. 1 and is mounted on a spin tester, for performing a spinning test of the rotor 10 after an assembly of the jig 18 and the rotor 10 is dynamically balanced. The metal jig 18 is made of carbon steel S45C (according to Japanese Industrial Standard) for machine structural use. At one axial end portion of the metal jig 18, there is provided a stepped fixing hole 20 formed on the centerline of the jig 18. The fixing hole 20 consists of an outer larger-diameter portion, and an inner small-diameter portion which has a diameter slightly larger than an outside diameter of the shaft portion 12 of the ceramic rotor 10. The ceramic rotor 10 is mounted on the metal jig 18 such that the shaft portion 12 is inserted into the small-diameter portion of the stepped fixing hole 20. The other axial end of the metal jig 18 has a mounting hole 26 formed coaxially with the fixing hole 20. The metal jig 18 is secured to the spin tester such that a drive shaft of the tester is inserted into the mounting hole 26.

The metal jig 18 is provided with four sets of balancing holes in the form of tapped holes 22, 24, 28 and 30 which are formed in the opposite end portions corresponding to the fixing and mounting holes 20, 26, as shown in FIGS. 3-5 (holes 24 shown only in FIG. 2). Described more specifically, the tapped holes 22, 24, 28 and 30 are all formed in the radial direction of the metal jig 18, so as to extend through the annular walls of the jig 18 defining the fixing and mounting holes 20, 26. In other words, the first group of holes 22 and 24 are open in the small-diameter portion of the fixing hole 20, while the second group of holes 28 and 30 are open in the mounting hole 26. All of these holes 22, 24, 28, 30 are open in the outer circumferential surface of the metal jig 18, so that they are easily accessible. As shown in FIG. 3, the eight tapped holes 22 are equally spaced apart from each other in the circumferential direction of the metal jig 18. Similarly, the eight tapped holes 24 are disposed in equally spaced-apart relation in the circumferential direction. As indicated in FIG. 2, these two sets of tapped holes 22 and 24 are spaced a short distance from each other along the axis of the small-diameter portion of the fixing hole 20. The four tapped holes 28, and the four tapped holes 30, are also formed in an equiangular relation, as shown in FIGS. 4 and 5, and the two sets of holes 28 and 30 are spaced apart a short distance from each other along the axis of the mounting hole 26 as indicated in FIG. 2. The two sets of holes 28 and 30 are formed such that the holes 30 are disposed between the holes 28 as viewed in the cross section of FIGS. 4 and 5. All of the tapped holes 22, 24, 28, 30 are tapped so that balancing pieces in the form of externally threaded screws 34 may be screwed therein.

The tapped holes 22, 24, 28, 30 are provided to receive the balancing screws 34, as required, for dynamically balancing the metal jig 18, more precisely, the assembly of the jig 18 and the ceramic rotor 10. While the tapped holes 22 and 24 are formed in the same circumferential positions, the holes 24 may be disposed such that they are located between the holes 22, as shown in the cross section of FIG. 3. In this specific arrangement, all holes 22, 24, 28, 30 are formed to be open in the stepped fixing hole 20 or mounting hole 26. However, it is not a prerequisite to form the tapped holes through the annular walls of the metal jig 18. If the jig-rotor assembly 10, 18 may be properly dynamically balanced by threading the screws 34 only in the screw holes 22 and 28, the tapped holes 24 and 30 may be eliminated.

Like a conventional jig, the metal jig 18 has three tapped holes 32 which are disposed closer to the bottom of the mounting hole 26 than the tapped holes 28, 30, as indicated in FIG. 2. The tapped holes 32 are equally spaced apart circumferentially an the jig 18, and are open in the mounting hole 26, so that fixing screws are threaded into the holes 32 to tighten the driving shaft of the spin tester inserted in the mounting hole 26.

While a ceramic rotor may be attached to a metal jig as illustrated above by means of a shrink fit or other commonly used methods, the ceramic rotor 10 in this example is attached to the metal jig 18, preferably by using suitable bonding agent to fix the shaft portion 12 to the fixing hole 20. The bonding agent used must has a bonding strength sufficient to withstand a force applied thereto during a spinning test of the rotor 10 at a high speed. For instance, the turbocharger ceramic rotor 10 of FIG. 1 is rotated at 140,000–200,000 r.p.m. in typical spinning tests. For such tests, a thermo-plastic resin or wax is suitably used as a bonding agent. In particular, it is preferred to use a bonding agent which may be softened into a molten state at around 150° C.

By using such a bonding agent, the ceramic rotor may be easily fixed to the metal jig, with various methods. For example, a method comprises the steps of: heating the metal jig to a predetermined temperature as with a hot plate; applying a coating of the bonding agent to the inner surface of the fixing hole in the metal jig, and thereby melting the bonding agent on the inner surface; and inserting the shaft portion of the ceramic rotor into the fixing hole in the jig, and securing the shaft portion to the jig. Another method available comprises the steps of: heating the metal jig to the predetermined temperature; inserting the shaft portion of the ceramic rotor into the fixing hole in the metal jig; and injecting the bonding agent into a clearance between the shaft portion of the rotor and the inner surface of the fixing hole, while rotating the jig and the rotor relative to each other. In removing the ceramic rotor from the metal jig after completion of a spinning test, the metal jig is again heated to melt the bonding agent, so that the ceramic rotor may be easily pulled out of the fixing hole. In attaching the ceramic rotor to the metal jig, the shaft portion of the rotor must not be necessarily bonded over its entire length, as long as the shaft portion is fixed to the jig with a sufficient bonding force to bear a stress which occurs in the spinning test.

While conventional fixing methods such as a shrink fit or a press fit may be used to attach the ceramic rotor to the metal jig, as previously stated, the use of a bonding agent is preferred because of a lower heating temperature of the metal jig than used in the shrink or press fit method. The lower heating temperature means less oxidation of the metal jig, and consequently longer service life of the jig. Further, the use of the bonding agent provides a considerable saving of working time for fixation of the rotor to the jig.

The assembly of the metal jig and the ceramic rotor attached thereto as described above is mounted on a dynamic balancing machine to dynamically balance the assembly, prior to a spinning test of the ceramic rotor. For establishing a dynamic balance of the assembly, a magnitude and a direction of unbalance of the assembly are detected by the balancing machine, and a suitable number of balancing screws are threaded in the appropriate tapped holes, so that the jig-rotor assembly is dynamically balanced.

Described in more detail, the dynamic balance of the assembly may be established in various ways, for example, by changing radial positions of the balancing screws in the tapped holes, by removing or attaching the appropriate screws, by using the balancing screws of different lengths and/or weights, or by practicing these adjusting methods in combination. In any case, the jig-rotor assembly may be readily dynamically balanced with a screw driver while the assembly is installed on the balancing machine. The balancing screws are locked in position in the screw holes with a suitable bonding cement or other locking agent.

The thus dynamically balanced assembly of the metal jig and the ceramic rotor is then mounted on the spin tester, to conduct an intended spinning test of the rotor. Upon completion of the spinning test, the assembly is dismounted from the spin tester. In this connection, it is noted that this removed metal jig may be used again for another ceramic rotor. Namely, it is possible to use the same metal jig repeatedly for many ceramic rotors, since the jig-rotor assembly is dynamically balanced by using balancing screws, according to the invention, rather than by cutting off portions of the metal jig according to a conventional method. Further, the use of a bonding agent to fix the ceramic rotor to the jig makes it possible to prevent the metal jig from being exposed to a high temperature (e.g., for a shrikage fit of the rotor in the jig), therefore permitting the metal jig to be used semipermanently.

While the present invention has been described in its preferred forms by reference to the accompanying drawings, it is to be understood that the invention is not confined to the foregoing disclosure, and that various changes and modifications may be made in the invention. For example, various pieces other than screws may be used as balancing pieces. In any case, however, it is required that the balancing pieces must be removably fixed in suitable balancing holes formed in the metal jig.

EXAMPLES

To further illustrate the present invention, there will be described one embodiment of a method of dynamically balancing the assembly of the turbocharger ceramic rotor 10 of FIG. 1 and the metal jig 18 of FIG. 2. The turbocharger ceramic rotor 10 is made of silicon nitride ($Si_3N_4$), and has a diameter of 60 mm at its vane portion 16. The metal jig 18 is made of carbon steel S45C, and is formed such that the diameter of the small-diameter portion of the fixing hole 20 is greater than the diameter of the shaft portion 12 of the rotor 10 by 30 $\mu$m.

Initially, the metal jig 18 was placed on a hot plate and heated at 150° C. for 10 minutes. Then, the inner surface of the fixing hole 20 was coated with paraffin wax, and the shaft portion 12 of the ceramic rotor 10 was inserted into the fixing hole 20. The thus obtained assembly of the metal jig 18 and the ceramic rotor 10 fixed thereto was mounted on a dynamic balancing machine, and the assembly was dynamically balanced by adjusting the radial positions of the balancing screws in the tapped holes 22, 24, 28 and 30. The dynamic balancing operation was completed in 15 minutes.

Subsequently, the dynamically balanced assembly of the metal jig 18 and the rotor 10 was attached to a spin tester, and was rotated at 150,000 r.p.m. The test revealed no abnormalities of the turbocharger ceramic rotor 10 and the metal jig 18 during the spinning of the assembly.

After the spinning test was completed, the jig-rotor assembly 18, 10 was placed on the hot plate, and heated again at 150° C. for 10 minutes. The turbocharger ceramic rotor 10 was then removed from the metal jig 18. A new turbocharger ceramic rotor 10 was fixed to the same metal jig 18, in the previously indicated manner. The jig-rotor assembly was dynamically balanced on the balancing machine, and subjected to a spinning test at 150,000 r.p.m. on the spin tester. No abnormal conditions were found during the test. The dynamic balancing operation was achieved in 15 minutes as in the previous cycle. In the same way, the same metal jig 18 was repeatedly used with different ceramic rotors 10, and the assembly was dynamically balanced in the same way as previously described. No abnormalities were found in the spinning tests. Thus, the metal jig 18 constructed according to the invention was found capable of being used semipermanently.

COMPARATIVE EXAMPLE

For comparison, a conventional metal jig 40, indicated in FIG. 6, was used to conduct a spinning test of the turbocharger ceramic rotor 10 of FIG. 1. The metal jig 40 is made of carbon steel S45C, and has a stepped fixing hole 42 at its one axial end portion. The fixing hole 42 has an axially inner small-diameter portion the diameter of which is smaller than the diameter of the shaft portion 12 of the rotor 10 by 30 $\mu$m. Further, the metal jig 40 has a mounting hole 44 at the other end portion, to accommodate a driving shaft of the balancing machine and the spin tester, for attaching the metal jig 40 to the equipment.

The metal jig 40 was initially heated at 450° C. for 10 minutes in an electric furnace. The shaft portion 12 of the turbocharger ceramic rotor 10 was then inserted into the fixing hole 42. Thus, the rotor shaft 12 was shrink-fit into the fixing hole 42. The assembly of the metal jig 40 and the ceramic rotor 10 was mounted on the dynamic balancing machine, and was dynamically balanced by removing suitable amounts of stock from portions A and B (FIG. 6) with a grinder. The dynamic balancing job required about 40 minutes.

The thus balanced assembly of the jig 40 and the rotor 10 was attached to the spin tester, and a spinning test was conducted at 150,000 r.p.m. No abnormalities of the jig 40 and the rotor 10 were found during the test.

After the spinning test, the assembly 40, 10 was heated at 450° C. for one hour in the electric furnace, and the ceramic rotor 10 was removed from the metal jig 40. The metal jig 40 was found oxidized on its surfaces. The oxidized metal jig 40 was used for another turbocharger ceramic rotor 10, and the jig-rotor assembly 40, 10 was mounted on the balancing machine, to establish a dynamic balance of the assembly. However, it was impossible to dynamically balance the assembly, because of the excessive amounts of removal of the stock in the preceding cycle, which caused an unbalance of the assembly too large to be corrected.

What is claimed is:

1. A method of dynamically balancing an assembly of a metal jig and an attached ceramic rotor, and spin testing said dynamically balanced assembly on a spin tester, the ceramic rotor having a shaft portion, and the metal jig having at one axial end thereof a fixing hole, comprising the steps of:
   (1) inserting said shaft portion of the ceramic rotor into said fixing hole of the metal jig, thereby fixing the ceramic rotor to said metal jig to form said assembly;
   (2) dynamically balancing said assembly by fixing at least one balancing piece in at least one of a plurality of balancing holes which are formed in a radial direction in said metal jig, said balancing occuring by changing a radial position of said at least one balancing piece in a corresponding one of said at least one balancing hole, said plurality of balancing holes having an opening at an outer surface of the metal jig;
   (3) spin testing said assembly on said spin tester;
   (4) removing said metal jig from said metal jig from said ceramic rotor after the ceramic rotor has been spin tested; and
   (5) fixing a shaft portion of another ceramic rotor into said fixing hole of the metal jig to form another assembly and repeating steps (2)-(4) recited above.

2. A method according to claim 1, wherein said plurality of balancing holes are tapped holes and said at least one balancing piece comprises an externally threaded screw.

3. A method according to claim 1, wherein said at least one balancing piece is selected from pieces of different sizes.

4. A method according to claim 1, wherein said at least one balancing piece is selected from pieces of different weights.

5. A method according to claim 1, wherein said shaft portion of the ceramic rotor is fixed in said fixing hole with a bonding agent.

6. A method according to claim 1, wherein said ceramic rotor is a turbocharger ceramic rotor.

7. A jig having a generally cylindrical shape for rotating a ceramic rotor in a dynamically balanced condition on a spin tester, comprising:
   a first axial end portion having a fixing hole into which a shaft portion of the ceramic rotor is inserted and fixed to; and
   balancing portions comprising a plurality of balancing holes which are formed in said first axial end portion and in a second opposite axial end portion of the jig, said plurality of balancing holes being open to an outer surface of the jig, said balancing holes being adapted to retain therein at least one balancing piece, said second axial end portion having a mounting hole for attachment to the spin tester.

8. A jig according to claim 7, wherein said balancing holes are formed in a radial direction of the jig.

9. A jig according to claim 7, wherein said plurality of balancing holes comprise a first group of holes which are formed at said first axial end portion and a second group of holes which are formed at said second axial end portion, said holes of each one of the first and second groups being equally spaced apart from each other in a circumferential direction on the jig.

10. A jig according to claim 9, wherein each of said first and second groups of holes comprise two sets of holes which are spaced apart from each other in an axial direction on the jig.

11. A jig according to claim 7, wherein said plurality of balancing holes comprise tapped holes for receiving externally threaded pieces.

* * * * *